United States Patent [19]

Kageyama et al.

[11] Patent Number: 4,864,013

[45] Date of Patent: Sep. 5, 1989

[54] RESIN HAVING EXCELLENT HEAT RESISTANCE AND EXHIBITING ANISOTROPY IN MOLTEN STATE

[75] Inventors: Yukihiko Kageyama, Fujinomiya; Noriyuki Hayashi, Fuji; Kenji Hijikata, Mishima, all of Japan

[73] Assignee: Polyplastics Co., Ltd., Osaka, Japan

[21] Appl. No.: 249,988

[22] Filed: Sep. 27, 1988

[30] Foreign Application Priority Data

Oct. 5, 1987 [JP] Japan ................................ 62-251108

[51] Int. Cl.$^4$ .......................... C08G 2/00; C08G 4/00; C08G 6/00; C08G 10/00
[52] U.S. Cl. ..................................... 528/220; 528/125; 528/128; 528/190; 528/193; 528/206; 528/271
[58] Field of Search ............... 528/220, 125, 128, 190, 528/193, 206, 271

[56] References Cited

U.S. PATENT DOCUMENTS

| | | | |
|---|---|---|---|
| 3,778,410 | 12/1973 | Kuhfuss et al. | 525/437 |
| 3,975,487 | 8/1976 | Cottis et al. | 264/210.6 |
| 4,067,852 | 1/1978 | Calundann | 528/190 |
| 4,184,996 | 1/1980 | Calundann | 524/605 |
| 4,562,244 | 12/1985 | Yoon | 528/193 |

*Primary Examiner*—John Kight
*Assistant Examiner*—M. L. Moore
*Attorney, Agent, or Firm*—Burns, Doane, Swecker & Mathis

[57] ABSTRACT

A polyester copolymer comprise 20 to 80 percent by mole of hydroxy-benzoic acid units, 1 to 40 percent by mole of naphthalene units and 1 to 40 percent by mole of dihydroxy-diphenylketone units. It is improved in the heat resistance and is specified by exhibiting the anisotropy in the molten state.

11 Claims, No Drawings

RESIN HAVING EXCELLENT HEAT RESISTANCE AND EXHIBITING ANISOTROPY IN MOLTEN STATE

The present invention relates to a polyester resin having excellent heat resistance and mechanical properties and exhibiting anisotropy in a molten state.

PRIOR ART

In recent years, various proposals have been made on a liquid crystal polymer exhibiting anisotropy in a molten state as a thermoplastic resin having a combination of heat resistance with processability.

Representative examples of the liquid crystal polymer include those disclosed in ① Japanese Patent Laid-Open No. 72393/1974 (corresponds to U.S. Pat. No. 3,778,410), ② Japanese Patent Laid-Open No. 43223/1975 (corresponds to U.S. Pat. No. 3,975,487), and ③ Japanese Patent Laid-Open No. 50594/1979 (corresponds to U.S. Pat. No. 4,184,996). Each of these liquid crystal polymers contains a rigid monomer introduced into the skeleton thereof to form a liquid crystal structure, thereby realizing a high strength and excellent processability.

Meanwhile, with an expansion of the applications for liquid crystal polymers, an improvement in the performance has been desired in the above-described resins as well. Specifically, it has been desired to provide a resin having a combination of soldering resistance, heat resistance aiming at high-temperature use, and excellent processability suitable for molding.

More specifically, it has been desired to provide a high performance resin exhibiting under employed processing conditions a melting point or a fluidizing temperature within a temperature range in which ordinary molding can be conducted, e.g., about 350° C. or below, and exhibiting a thermal deformation temperature, serving as an indication of the heat resistance, of about 200° C. or above.

In order to attain this purpose, it is necessary to simultaneously satisfy two properties contradictory to each other, i.e., a lowering in the melting point or the fluidizing point and an increase in the thermal deformation temperature. Although the above-described conventional polymer ① satisfies the requirement with respect to the thermal deformation temperature, i.e., 200° C. or above, it does not satisfy the requirement with respect to the molding temperature, i.e., 350° C. or below. Although the above-described conventional polymers ② and ③ satisfy the requirement with respect to the molding temperature, i.e., 350° C. or below, the thermal deformation temperatures of the conventional polymers ② and ③ are 100° C. or below and 180° C., respectively, and therefore are below the above-described desirable thermal deformation range. Further, since all the above-described conventional polymers have an ester bond as the bonding means, there is a fear of spoiling the mechanical properties under severe service conditions such as continuous use in a hot water environment.

SUMMARY OF THE INVENTION

In view of the above-described circumstances, the present inventors have made extensive and intensive studies with a view to developing a thermoplastic resin not only having heat resistance and processability respectively within the above-described desirable ranges but also exhibiting excellent mechanical properties even in severe environments and, as a result, have found that a polyester prepared from a particular monomer can solve the above-described problems and offer a good balance of the properties, which has led to the completion of the present invention.

Specifically, in accordance with the present invention, there is provided a resin having excellent heat resistance and exhibiting anisotropy in a molten state, characterized by having, in its main chain, three groups represented by the following formulae (I) to (III) as indispensable components respectively in the following amounts:

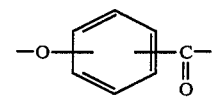

(I)

20 to 80% by mole based on polymer

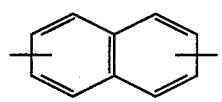

(II)

1 to 40% by mole based on polymer

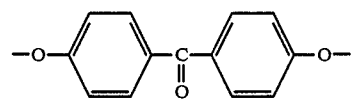

(III)

1 to 40% by mole based on polymer.

In other words, the invention provides a polyester copolymer which comprises 20 to 80 percent by mole of hydroxy-benzoic acid units having the formula (I), 1 to 40 percent by mole of naphthalene units having the formula (II) and 1 to 40 percent by mole of dihydroxy-diphenylketone units having the formula (III). The copolymer of the invention is improved in the heat resistance and is specified by exhibiting the anisotropy in the molten state.

It is preferred that the naphthalene units are selected from the group consisting of groups having the formulae (II-a), (II-b), (II-c) and (II-d), respectively, below shown. One embodiment of the copolymer is obtained from p-acetoxybenzoic acid, 2,6-dicarboxynaphthalene and 4,4'-diacetoxydiphenylketone.

The bonding site of the hydroxybenzoic acid residue represented by the above formula (I) is either or both of the m- and p-positions. However, it is preferred that the residue be a hydroxybenzoic acid residue having a bonding site at the p-position. Further, a residue of acetoxybenzoic acid which is a derivative of the hydroxybenzoic acid may also be used as the component.

It is preferred that the naphthalene residue represented by the above formula (II) be at least one member selected from among a naphthalenedicarboxylic acid residue (II-a), a naphthalenediol residue (II-b), a hydroxynaphthoic acid residue (II-c), and a hydroxynaphthylamine residue (II-d).

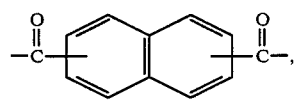

(II-a)

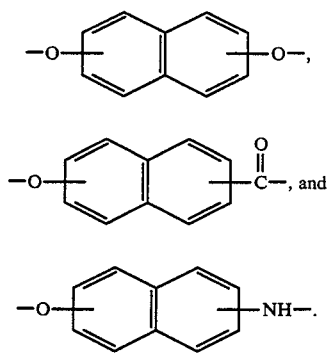

(II-b)

(II-c)

(II-d)

The bonding site of the naphthalene group (II) is at least one member selected from among 1,4-positions, 1,6-positions, 1,7-positions, 2,6-positions, and 2,7-positions. It is preferred that the naphthalene group have bonding sites at the 1,4-positions, 2,6-positions, or 2,7-positions.

The group represented by the above formula (III) which is an indispensable component in the present invention is essential to offer a good balance between the heat resistance and the processability, and particular examples thereof include 4,4'-dihydroxydiphenyl ketone and derivatives thereof, e.g., 4,4'-diacetoxydiphenyl ketone.

According to the studies conducted by the present inventors, the compound having the above-described skeleton per se is in a twisted state, which enables a suitable degree of twisting to be imparted to a rigid skeleton of the polymer chain formed by the groups represented by the above formula (I) and (II), thereby imparting heat resistance and processability to the polymer. The component (III) is indispensable in order to impart these properties, and rigid compounds, such as hydroquinone or 4,4'-dihydroxybiphenyl, are not preferable. Further, a bisphenol type group having a skeleton similar thereto, such as 4,4'-dihydroxydiphenylpropane, is unsuitable for imparting the heat resistance either. It is quite unexpectable and surprising that only the coexistence of the skeleton component represented by the above formula (III) can not only offer a good balance between the heat resistance and the processability but also improve the hydrolysis resistance in a hot state.

The components (I), (II), and (III) constituting the polymer of the present invention may have suitable substituent(s) as far as the polymer can form a liquid crystal structure.

Among the components of the polymer, the content of the component (I) is preferably at most 80% by mole and at least 20% by mole. When the content exceeds 80% by mole, the processability is spoiled, while when the content is less than 20% by mole, it is difficult to form a liquid crystal structure.

The contents of the components (II) and (III) are each preferably 1 to 40% by mole. When the contents of the components (II) and (III) are each outside the range of 1 to 40% by mole, the heat resistance, mechanical properties, and processability are spoiled.

That is, when the contents of the components (I), (II), and (III) are outside the respective desirable ranges, it is impossible to maintain a good balance among the heat resistance, the processability, and the mechanical properties.

Further, the resin prepared according to the present invention may contain, besides the above-described indispensable components, a residue of a monomer capable of creating an ester or an esteramide bond. Representative examples of the residue include a phenylene skeleton, a biphenylene skeleton, a skeleton represented by the following general formula (IV):

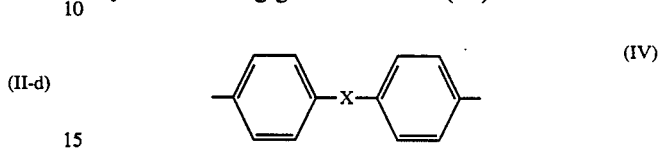

wherein X is —CH$_2$—,

—O—, —O—, —S—, or —SO$_2$—, and an alkylene skeleton.

Specific examples of the phenylene skeleton include terephthalic acid, isophthalic acid, hydroquinone, resorcinol, and aminophenol.

Examples of the biphenylene skeleton include 4,4'-dihydroxybiphenyl, 4,4'-dicarboxybiphenyl, and 4-hydroxy-4-carboxybiphenyl.

Examples of the skeleton represented by the general formula (IV) include 4,4'-dihydroxydiphenylmethane, 4,4'-dihydroxydiphenylpropane, 4,4'-dihydroxydiphenyl ether, 4,4'-dihydroxydiphenyl sulfide, and 4,4'-dihydroxydiphenyl sulfone.

Representative examples of the alkylene skeleton include ethylene glycol, propylene glycol, and 1,4-butanediol.

It is preferred that the content of the components other than the above-described indispensable components do not exceed 40% by mole in terms of the units of the component contained in the polymer. When the content exceeds 40% by mole, the values of the heat resistance and the processability fall outside the above-described preferable range. The content is preferably 30% by mole or less.

The polymer of the present invention can be prepared by any of the conventional general processes, e.g., melt polymerization, solution polymerization, interfacial polymerization, and solid phase polymerization, by making use of monomers respectively having the above-described constituent groups and capable of causing a reaction such as esterification or amidation. A polymer having a particular composition with respect to the components thereof can be prepared from the monomers used in proportions substantially corresponding to that particular composition.

In the production of the polymer, the reaction substantially proceeds even in the absence of any catalyst. However, conventional transesterification catalysts may be used. Examples of such catalysts include magnesium acetate, manganese acetate, stannous acetate, cobalt acetate, zinc acetate, germanium oxide, lead oxide, antimony trioxide, and bismuth trioxide. The catalyst is used in an amount of 0.01 to 0.2% by weight based on the total amount of the monomers.

The polymer of the present invention is insoluble in general solvents. However, it is soluble in pentafluorophenol and generally exhibits an inherent viscosity of at least 0.4 dl/g when dissolved in pentafluorophenol at 60° C. so as to have a polymer concentration of 0.1% by weight.

The polymer of the present invention exhibits anisotropy in a molten state.

The properties of the anisotropic melt phase may be examined by a customary polariscopic method using crossed Nicol prisms. More particularly, the presence of the anisotropic melt phase can be confirmed by observing a sample placed on a Leitz hot stage in a nitrogen atmosphere at a magnification of 40 under a Leitz polarization microscope. The above-described polymer is optically anisotropic. Namely, when it is placed between crossed Nicol prisms, it transmits light. If the sample is optically anisotropic, the polarized light can be transmitted, even when it is in a static state.

EFFECT OF THE INVENTION

The polyester resin of the present invention is superior to the conventional liquid crystal polymers in the balance between the heat resistance and the processability as well as in the hydrolysis resistance, which enables the use in severe environments and renders the polyester resin of the present invention useful from the industrial point of view.

EXAMPLES

The present invention will now be described in more detail with reference to the following Examples which should not be construed as limiting the scope of the present invention. The liquid crystal structure of the prepared resin was confirmed by a Leitz polarization microscope, while the inherent viscosity was measured in pentachlorophenol. The melting point was measured with a differential scanning calorimeter. When the melting point could not be directly measured, it was determined from a fluidizing temperature measured under a polarization microscope. The hydrolysis resistance was expressed in terms of the retention of the inherent viscosity after immersion in boiling water of a film formed by casting with a solvent relative to the value obtained with the film before treatment.

The thermal deformation temperature was determined by preparing a specimen from the obtained polymer according to a customary method, followed by measurement of the thermal deformation temperature according to ASTM-D 648.

EXAMPLE 1

A reactor equipped with a nitrogen inlet and a distilling tube was charged with 60% by mole of p-acetoxybenzoic acid, 20% by mole of 2,6-dicarboxynaphthalene, 20% by mole of 4,4'-diacetoxydiphenyl ketone, and potassium acetate in an amount of 0.05% by weight based on the total amount of the charged. The mixture was heated to raise the temperature to 260° C. over a period of 1 hr in a nitrogen gas stream. The mixture was then heated at 260° to 300° C. for 2 hr while distilling acetic acid from the reactor, and then at 300° to 360° C. for additional 1 hr. The introduction of nitrogen was finally stopped, and the container was evacuated to 0.1 Torr for 15 min. The reaction mixture was stirred at that temperature and pressure for 30 min.

The polymer thus obtained was subjected to measurements of the inherent viscosity, melting point, hydrolysis resistance, and thermal deformation temperature. The results are shown in Table 1.

EXAMPLES 2 TO 6

The polymerization was conducted in the composition shown in Table 1 in the same manner as that of Example 1 to measure the physical properties of the polymer in the same manner as that of Example 1. The results are shown in Table 1.

COMPARATIVE EXAMPLES 1 TO 8

The polymerization was conducted in the composition shown in Table 1 in the same manner as that of Example 1 except for Comparative Examples 3, 6, and 8, to measure the physical properties of each polymer in the same manner as that of Example 1 except for Comparative Example 8. The results are shown in Table 1.

In Comparative Examples 3, 6, and 8, the mixture was heated at 260° C. to 300° C. for 2 hr during the polymerization, and then at 300° to 420° C. for additional 1 hr. All the other conditions were the same as those of Example 1. The polymer in Comparative Example 8 became insoluble and infusible during the polymerization, which made it impossible to conduct the subsequent measurements.

TABLE 1

| Ex. and Comp. Ex. | (I) hydroxy-benzoic acid | (II)* naphthalene compound | (III) 4,4'-dihydroxydiphenyl ketone | other components | inherent viscosity (dl/g) | melting point or fluidizing point (°C.) | thermal deformation temperature (°C.) | percentage retention of viscosity (%) |
|---|---|---|---|---|---|---|---|---|
| Ex. 1 | 60 | NDA 20 | 20 | — | 3.1 | 310 | 210 | 92 |
| Comp. Ex. 1 | 60 | NDA 20 | — | bisphenol A 20 | 2.1 | 245 | 140 | 49 |
| Comp. Ex. 2 | 60 | NDA 20 | — | hydroquinone 20 | 2.8 | 280 | 185 | 51 |
| Comp. Ex. 3 | 60 | NDA 20 | — | 4,4'-bisphenol 20 | 3.2 | 375 | 240 | 62 |
| Ex. 2 | 60 | HNA 20 | 10 | terephthalic acid 10 | 5.9 | 285 | 205 | 81 |
| Comp. Ex. 4 | 75 | HNA 25 | — | — | 5.7 | 280 | 180 | 65 |
| Ex. 3 | 60 | DHN 10 | 10 | terephthalic acid 20 | 2.5 | 295 | 205 | 87 |
| Comp. Ex. 5 | 60 | DHN 20 | — | terephthalic acid 20 | 2.3 | 290 | 180 | 55 |
| Ex. 4 | 60 | NDA 10 | 20 | terephthalic acid 10 | 2.8 | 295 | 210 | 86 |
| Comp. Ex. 6 | 60 | — | 20 | terephthalic acid 20 | 6.0 | 390 | 255 | 80 |

TABLE 1-continued

| Ex. and Comp. Ex. | resin composition (numerals: mol %) | | | | inherent viscosity (dl/g) | melting point or fluidizing point (°C.) | thermal deformation temperature (°C.) | percentage retention of viscosity (%) |
| --- | --- | --- | --- | --- | --- | --- | --- | --- |
| | (I) hydroxy-benzoic acid | (II)* naphthalene compound | (III) 4,4'-dihydroxydiphenyl ketone | other components | | | | |
| Comp. Ex. 7 | 5 | HNA 5 | 45 | terephthalic acid 45 | 2.1 | 240 | 180 | 72 |
| Comp. Ex. 8 | 85 | HNA 5 | 5 | terephthalic acid 5 | impossible to measure because polymer is insoluble and infusible. | | | |
| Ex. 5 | 30 | NDA 35 | 35 | — | 3.4 | 280 | 200 | 87 |
| Ex. 6 | 60 | NDA 20 | 10 | hydroquinone 10 | 2.7 | 295 | 215 | 83 |

Note:
*NDA: 2,6-dicarboxynaphthalene
HNA: 2-hydroxy-6-carboxynaphthalene
DHN: 2,6-dihydroxynaphthalene

We claim:

1. A polyester copolymer which exhibits anisotropy in the molten state, a heat deformation temperature of at least 200° C., and a melting temperature of no more than 350° C. consisting essentially of 20 to 80 mole percent of hydroxy-benzoic acid units having the formula (I), 1 to 40 mole percent of naphthalene units having the formula (II), and 1 to 40 mole percent of dihydroxydiphenylketone units having the formula (III), wherein:

(I) is 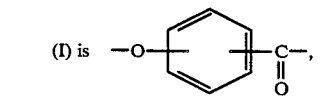

(II) is 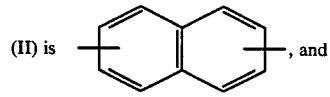, and (III) is 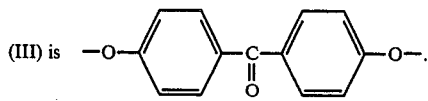.

2. A polyester copolymer as claimed in claim 1, in which the naphthalene units are selected from the group consisting of groups having the formulae (II-a), (II-b), (II-c) and (II-d), respectively

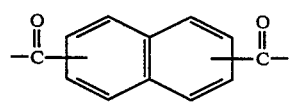 (II-a)

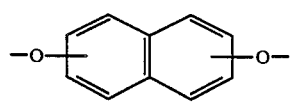 (II-b)

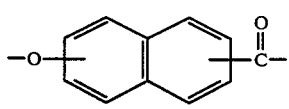 (II-c)

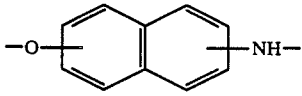 (II-d)

3. A polyester copolymer as claimed in claim 1, which is obtained from p-acetoxybenzoic acid, 2,6-dicarboxynaphthalene and 4,4'-diacetoxydiphenylketone.

4. A polyester copolymer as claimed in claim 1, which exhibits an inherent viscosity of at least 0.4 dl/g when dissolved in pentaflorophenol in a concentration of 0.1 percent by weight at 60° C.

5. A polyester copolymer as claimed in claim 1, wherein the bonding sites of the hydroxy-benzoic acid residue (I) are selected from the group consisting of m-positions, p-positions, and a mixture of m-positions and p-positions.

6. A polyester copolymer as claimed in claim 1, wherein the bonding sites of the hydroxy-benzoic acid residue (I) are in the p-positions.

7. A polyester copolymer as claimed in claim 1, wherein the bonding sites for naphthalene group (II) are selected from the group consisting of 1,4-positions, 2,6-positions, and 2,7-positions.

8. A polyester copolymer as claimed in claim 1, wherein the bonding sites for naphthalene group II are in the 2,6-positions.

9. A polyester copolymer as claimed in claim 1, wherein naphthalene group II is derived from 2,6-dicarboxynaphthalene.

10. A polyester copolymer as claimed in claim 1, which contains 10 to 35 mole percent of naphthalene group (II), and 10 to 35 mole percent of units derived from dihydroxy-diphenylketone (III).

11. A polyester copolymer as claimed in claim 3 obtained by the polymerization of 60 mole percent of p-acetoxybenzoic acid, 20 mole percent of 2,6-dicarboxynaphthalene, and 20 mole percent of 4,4-diacetoxydiphenylketone.

* * * * *